(12) United States Patent
He et al.

(10) Patent No.: US 7,403,133 B2
(45) Date of Patent: Jul. 22, 2008

(54) DYNAMIC PRIMARY FLIGHT DISPLAYS FOR UNUSUAL ATTITUDE CONDITIONS

(75) Inventors: Gang He, Morristown, NJ (US); Ivan S Wyatt, Scottsdale, AZ (US); Jary E. Engels, Peoria, AZ (US); Thea L. Feyereisen, Hudson, WI (US); Aaron J. Gannon, Anthem, AZ (US); Blake W. Wilson, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 205 days.

(21) Appl. No.: 11/250,124

(22) Filed: Oct. 13, 2005

(65) Prior Publication Data

US 2007/0085705 A1    Apr. 19, 2007

(51) Int. Cl.
*G01C 21/00* (2006.01)
(52) U.S. Cl. .................. 340/974; 340/975; 701/4
(58) Field of Classification Search ............... 340/966, 340/971, 973, 974, 975, 980; 701/4, 14; 345/156
See application file for complete search history.

(56) References Cited

U.S. PATENT DOCUMENTS

| | | | |
|---|---|---|---|
| 4,090,189 A | 5/1978 | Fisler | |
| 4,241,294 A | 12/1980 | Fisler | |
| 4,358,713 A | 11/1982 | Senoo et al. | |
| 4,514,727 A | 4/1985 | Van Antwerp | |
| 4,868,652 A | 9/1989 | Nutton | |
| 5,198,812 A * | 3/1993 | Probert | 340/975 |
| 5,201,032 A | 4/1993 | Kurose | |
| 5,202,668 A | 4/1993 | Nagami | |
| 5,343,395 A | 8/1994 | Watts | |
| 5,426,727 A | 6/1995 | Sugiura et al. | |
| 5,486,821 A | 1/1996 | Stevens et al. | |
| 5,745,095 A | 4/1998 | Parchem et al. | |
| 5,745,863 A | 4/1998 | Uhlenhop et al. | |
| 5,747,863 A | 5/1998 | Shoda | |
| 5,757,127 A | 5/1998 | Inoguchi et al. | |
| 5,838,262 A | 11/1998 | Kershner et al. | |
| 6,057,856 A | 5/2000 | Miyashita et al. | |
| 6,166,744 A | 12/2000 | Jaszlics et al. | |
| 6,208,933 B1 | 3/2001 | Lazar | |
| 6,327,089 B1 | 12/2001 | Hosaki et al. | |
| 6,359,737 B1 | 3/2002 | Stringfellow | |
| 6,486,856 B1 | 11/2002 | Zink | |
| 6,496,670 B1 | 12/2002 | Michaelson et al. | |
| 6,504,518 B1 | 1/2003 | Kuwayama et al. | |

(Continued)

FOREIGN PATENT DOCUMENTS

WO    2004006203 A1    1/2004

OTHER PUBLICATIONS

European Search Report EP06122069.5 dated Feb. 7, 2008.

*Primary Examiner*—Brent A. Swarthout
(74) *Attorney, Agent, or Firm*—Ingrassia, Fisher & Lorenz, P.C.

(57) ABSTRACT

Embodiments of the present invention provide a method of dynamically transitioning into a distinct display format during unusual attitude conditions. In one embodiment, the method includes collecting attitude data, comparing current attitude to a first set attitude angle, and fading a distinct display format into a display for unusual attitude conditions when current attitude is at least equal to the first set attitude angle.

24 Claims, 8 Drawing Sheets

U.S. PATENT DOCUMENTS

| | | |
|---|---|---|
| 6,545,677 B2 | 4/2003 | Brown |
| 6,545,803 B1 | 4/2003 | Sakuma et al. |
| 6,567,014 B1 * | 5/2003 | Hansen et al. ............. 340/980 |
| 6,570,559 B1 | 5/2003 | Oshima |
| 6,570,581 B1 | 5/2003 | Smith |
| 6,608,568 B1 | 8/2003 | Ruchti |
| 6,618,045 B1 | 9/2003 | Lin |
| 6,636,277 B2 | 10/2003 | Eberhardt et al. |
| 6,650,340 B1 | 11/2003 | Georges et al. |
| 6,678,588 B2 | 1/2004 | He |
| 6,690,296 B2 | 2/2004 | Corwin et al. |
| 6,690,299 B1 | 2/2004 | Suiter |
| 6,690,351 B1 | 2/2004 | Wong |
| 6,700,482 B2 | 3/2004 | Ververs et al. |
| 6,703,945 B2 | 3/2004 | Kuntman et al. |
| 6,727,489 B2 | 4/2004 | Yano |
| 6,744,478 B1 | 6/2004 | Asakura et al. |
| 6,747,650 B2 | 6/2004 | Turner et al. |
| 6,762,801 B2 | 7/2004 | Weiss et al. |
| 2002/0167536 A1 | 11/2002 | Valdes et al. |
| 2002/0171639 A1 | 11/2002 | Ben-David |
| 2003/0016236 A1 | 1/2003 | Bronson |
| 2003/0122810 A1 | 7/2003 | Tsirkel et al. |
| 2004/0201589 A1 | 10/2004 | Ekstrom |
| 2004/0201596 A1 | 10/2004 | Coldefy et al. |
| 2005/0007261 A1 | 1/2005 | Berson et al. |
| 2005/0007386 A1 | 1/2005 | Berson et al. |

* cited by examiner

DYNAMIC PRIMARY FLIGHT DISPLAYS FOR UNUSUAL ATTITUDE CONDITIONS

CROSS REFERENCE TO RELATED APPLICATIONS

The present application is related to application Ser. No. 11/537,898 (The '346 application). The '346 application is incorporated herein by reference.

TECHNICAL FIELD

The present invention generally relates to graphical display systems and, in particular, to dynamic flight displays.

BACKGROUND

With respect to flight, attitude refers generally to the position of an aircraft or spacecraft relative to the horizon or a celestial object, respectively. In the context of aircraft, attitude refers to the angles for pitch, yaw and bank. With regards to spacecraft, attitude refers to the spacecraft's angular position and rotation. In both situations, it is essential to maintain and control proper attitude conditions. Unusual attitude conditions refer to situations where the craft is at an extreme angle or deviation. For example, in aircraft, such situations include having a high pitch angle or being banked at a high angle. When a craft is in an unusual attitude condition, it is important for the flight crew to correct and return the attitude to normal.

In unusual attitude conditions, direct outside views and conformal visual image displays, such as those containing perspective view backgrounds, are not always effective ways of providing clear cues of attitude upset information for a variety of reasons. In particular, perspective view backgrounds with 3-dimensional terrain, runways, etc. can make it difficult for flight crews to ascertain the correct horizon line. However, these displays greatly aid flight crews during normal flight and removal of perspective view backgrounds can distract or even startle flight crews when taking proper recovery actions.

For the reasons stated above, and for other reasons stated below which will become apparent to those skilled in the art upon reading and understanding the present specification, there is a need in the art for a display which minimizes distractions to a flight crew during unusual attitude conditions.

SUMMARY

Embodiments of the present invention solve the problem of providing a display which minimizes distractions to a flight crew during unusual attitude conditions.

In one embodiment, a method of dynamically transitioning into a distinct display format during unusual attitude condition is provided. The method comprises collecting attitude data, comparing current attitude to a first set attitude angle, and fading a distinct display format into a display for unusual attitude conditions when current attitude is at least equal to the first set attitude angle.

In another embodiment, a graphical display system is provided. The graphical display system comprises one or more sensors for collecting attitude data, a display element for displaying flight data, and at least one processor coupled to the one or more sensors and the display element for processing data collected by the one or more sensors. The at least one processor sends signals to the display element instructing the display element to fade in a distinct display format when a current attitude angle reaches a first set attitude angle.

In another embodiment, a computer readable medium having computer-executable instructions for performing a method of dynamically transitioning into a distinct display format during unusual attitude conditions is provided. The method comprises measuring at least one of a plurality of attitude angles, wherein the pluratlity of attitude angles define a craft's attitude, and comparing the at least one of a plurality of attitude angles to a corresponding first set attitude angle. The method also comprises sending a signal to a display element instructing the display element to gradually fade in a distinct display format once at least one of the plurality of attitude angles equals the corresponding first set attitude angle.

In yet another embodiment, a graphical display system if provided. The graphical display system comprises means for collecting attitude data, means for executing instructions for fading in a distinct display format when a current attitude angle reaches a first set attitude angle and means for displaying the distinct display format.

DRAWINGS

DETAILED DESCRIPTION

Figure 1:
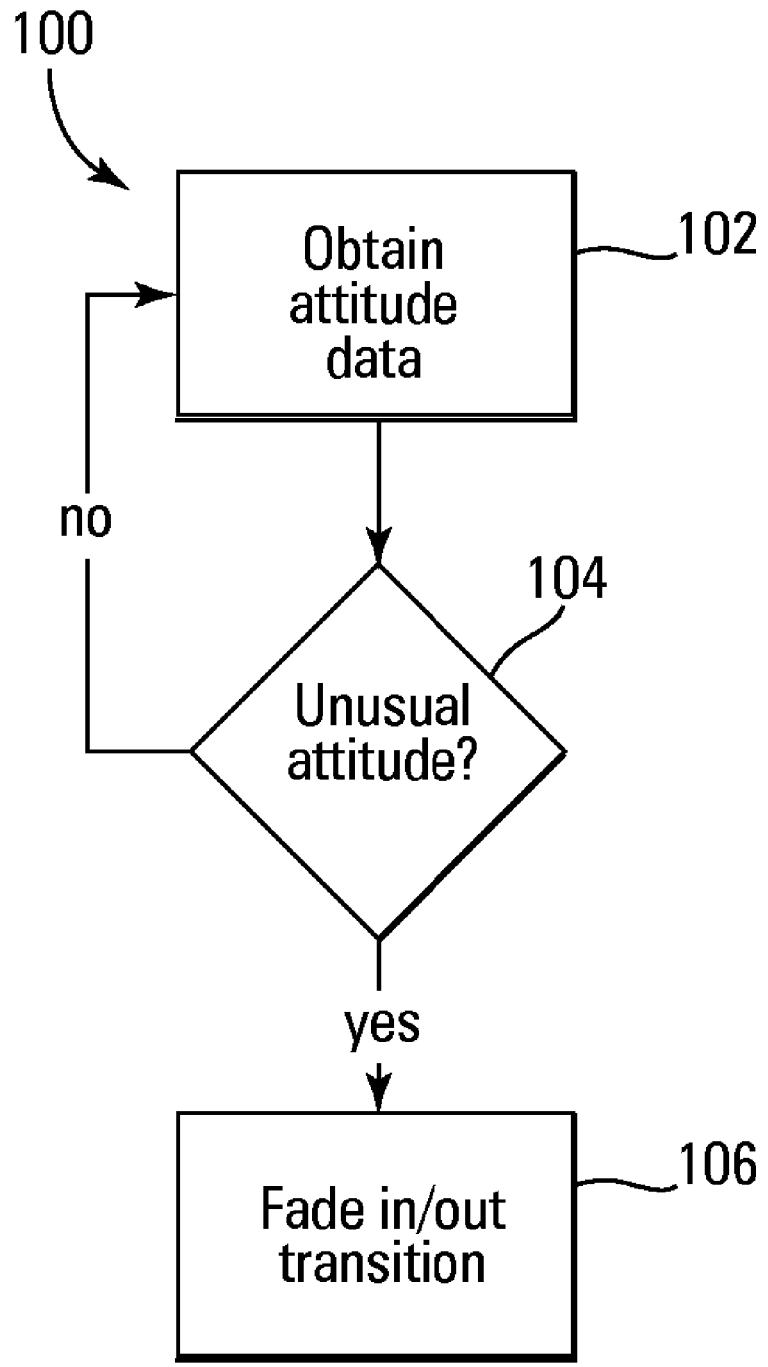
FIG. 1 is a flow chart showing a method of dynamically transitioning into a distinct display format according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. Furthermore, it will be understood by one of skill in the art that although the specific embodiments illustrated below are directed at aircraft for purposes of explanation, the method and apparatus may be used in various embodiments employing various types of displays, such as displays in space craft, helicopters, and unmanned air vehicles (UAV). Moreover, embodiments of the present invention are suitable for use on CRT, LCD, plasma displays or any other existing or later developed display technology.

It should also be understood that the exemplary methods illustrated may include additional or fewer steps or may be performed in the context of a larger processing scheme. Furthermore, the methods presented in the drawing figures or the specification are not to be construed as limiting the order in which the individual steps may be performed. Instructions for carrying out the various methods, process tasks, calculations, control functions, and the generation of display signals and other data used in the operation of the display system are implemented in software programs, firmware or computer readable instructions. These instructions are typically stored on any appropriate medium used for storage of computer readable instructions such as floppy disks, conventional hard disks, CD-ROM, flash memory ROM, nonvolatile ROM, RAM, and other like medium. The following detailed description is, therefore, not to be taken in a limiting sense.

Embodiments of the present invention aid flight crews in identifying when an aircraft is in unusual attitude conditions by transitioning to a distinct display format. Since direct outside views and current conformal visual image displays are not always effective means of aiding flight crews in identifying unusual attitude conditions, embodiments of the present invention give flight crews a great advantage over existing technology. In addition, distinct display formats in embodiments of the present invention aid flight crews in taking proper recovery actions by removing non-necessary data and providing necessary data in clear and intuitive formats. Finally, embodiments of the present invention enable these advantages while minimizing distraction and not startling flight crews as a distinct display format is transitioned into the display.

FIG. 1 is a flow chart showing a method of dynamically transitioning into a distinct display format according to one embodiment of the present invention. The distinct display format for unusual attitude conditions is distinct from a normal attitude display format used for normal attitude conditions. At 102, attitude data is collected. In aircraft, this includes data on the pitch, bank and yaw angles of the aircraft. The angles which define whether an aircraft is in an unusual attitude condition vary depending on the type of aircraft and flight conditions. For example, the pitch angles which define an unusual attitude condition in a Boeing 747 are not necessarily the same pitch angles which define an unusual attitude condition in a Cessna Skyhawk. The knowledge of how to determine appropriate angles defining unusual attitude conditions for different aircraft and flight conditions is known to one of skill in the art.

At 104, the current aircraft attitude obtained from the attitude data is compared to a set attitude angle. If the current aircraft attitude angle is less than the set attitude angle, the process returns to 102 and updated current attitude data is collected. If the current aircraft attitude angle is equal to or greater than the set attitude angle, it is determined that the aircraft is entering unusual attitude conditions and the process continues at 106. The set angle varies depending on the type of craft, flight conditions, and attitude angle being analyzed. For example, in some embodiments, a set attitude angle for an aircraft is not the same as a set attitude angle for a helicopter. Additionally, in some embodiments, a set attitude angle for analyzing a bank angle is different than a set attitude angle for measuring pitch angle. Further, in some embodiments, a set attitude angle for measuring a positive pitch angle is not the same as a set attitude angle for measuring a negative pitch angle, where positive and negative is determined in relation to a zero-pitch reference line.

At 106, a distinct display format is faded into the display. In some embodiments, fading in a distinct display format includes fading out some graphics displayed on a normal attitude display format and fading in some graphics displayed on the distinct display format for unusual attitude conditions. For example, in some embodiments, fading in a distinct display format includes fading out perspective view graphics used on a normal attitude display format such as 3-dimensional terrain, runways, etc. In other embodiments, fading in a distinct display format includes fading out flight symbols used on a normal attitude display format, but which are not necessary in a distinct display format for unusual attitude conditions. In such embodiments, the determination of what flight symbols are non-necessary and should be faded out depends on the aircraft and flight conditions. In some such embodiments, these non-necessary flight symbols include flight path markers and speed deviation tapes. In other such embodiments, other flight symbols are non-necessary and faded out. Additionally, in some embodiments, fading in a distinct display format includes gradually moving and aligning the horizon line on the display with the zero-pitch reference line. The two reference lines are maintained together while the aircraft is in unusual attitude conditions. Such embodiments further aid flight crews by alleviating possible confusion when the zero-pitch line and the horizon line are not at the same position. In other embodiments, fading in a distinct display format includes fading in a two color overlay wherein the color above a zero-pitch reference line is different from the color below the zero-pitch reference line.

Figure 2:
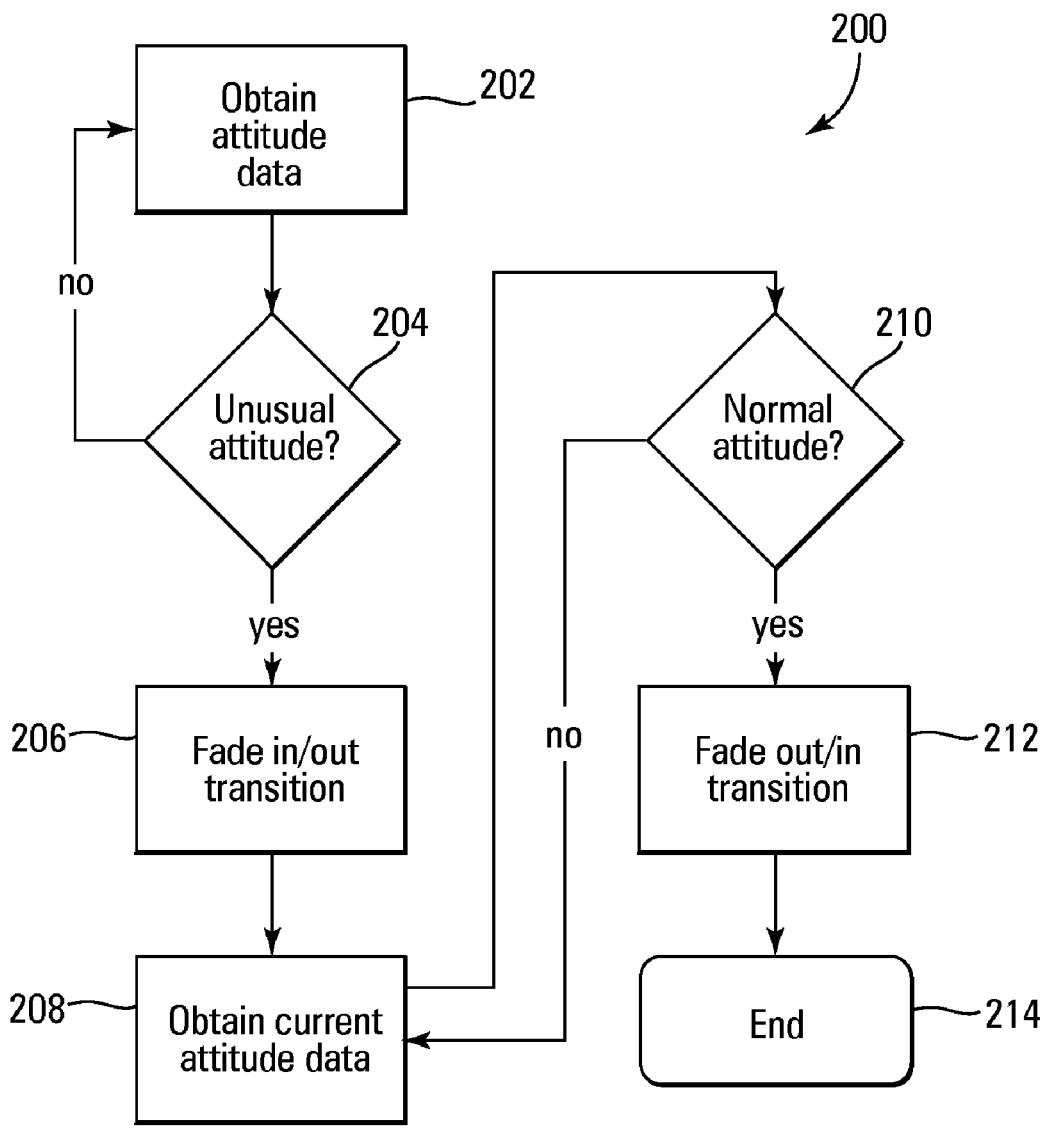
FIG. 2 is a flow chart showing another method of dynamically transitioning into a distinct display format according to one embodiment of the present invention.
Figure 3:
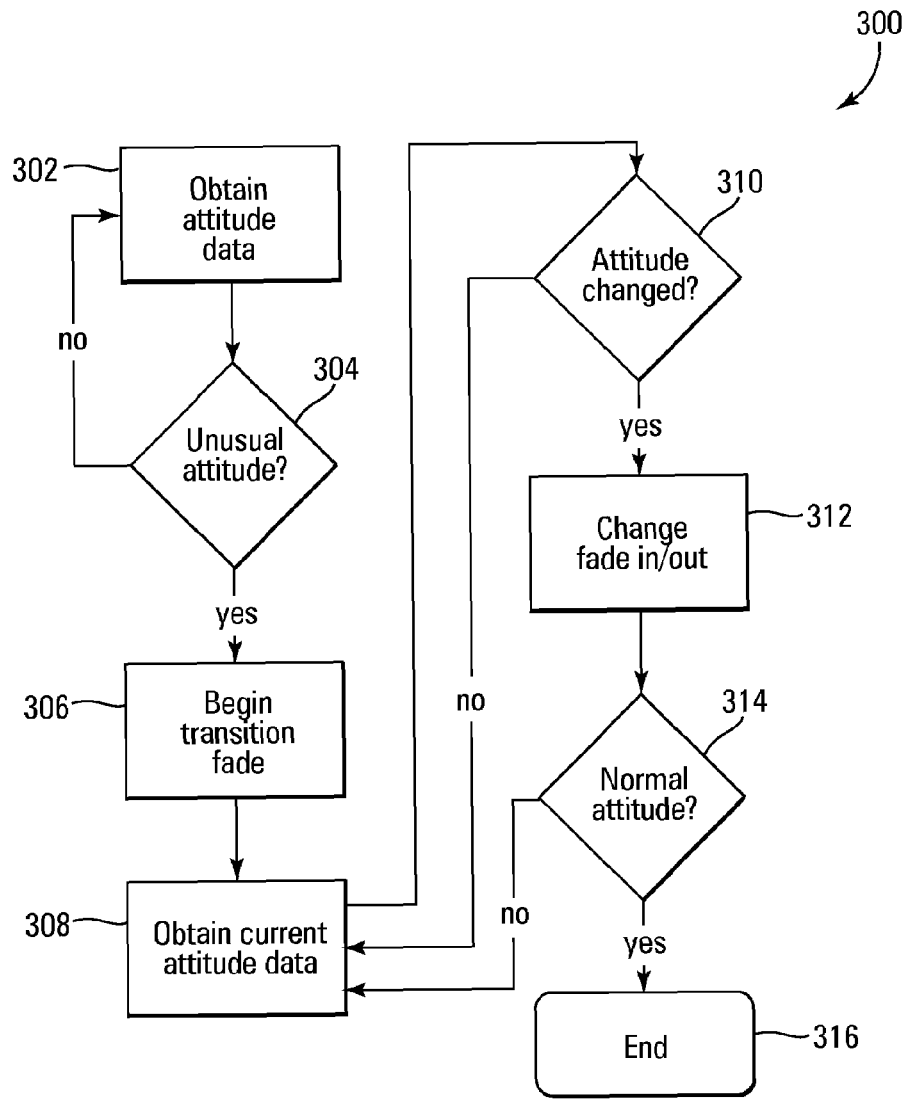
FIG. 3 is a flow chart showing another method of dynamically transitioning into a distinct display format according to one embodiment of the present invention.
Figure 6:
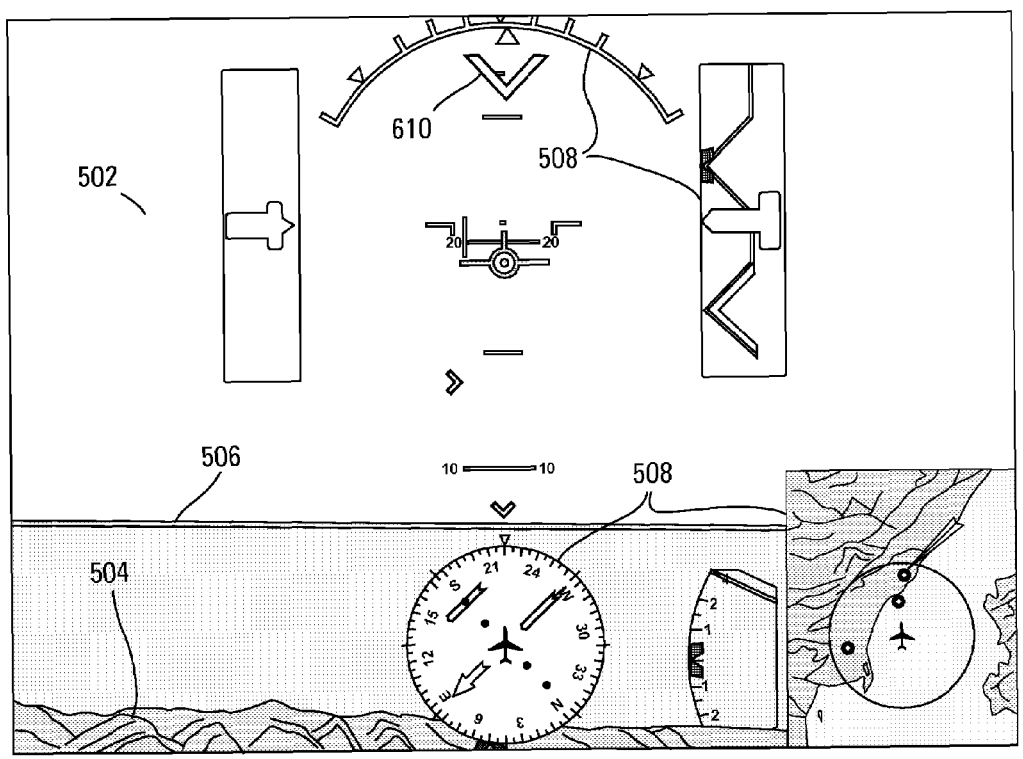
FIG. 6 is an image of a graphical display with a distinct display format for unusual attitude conditions according to one embodiment of the present invention.
Figure 8:
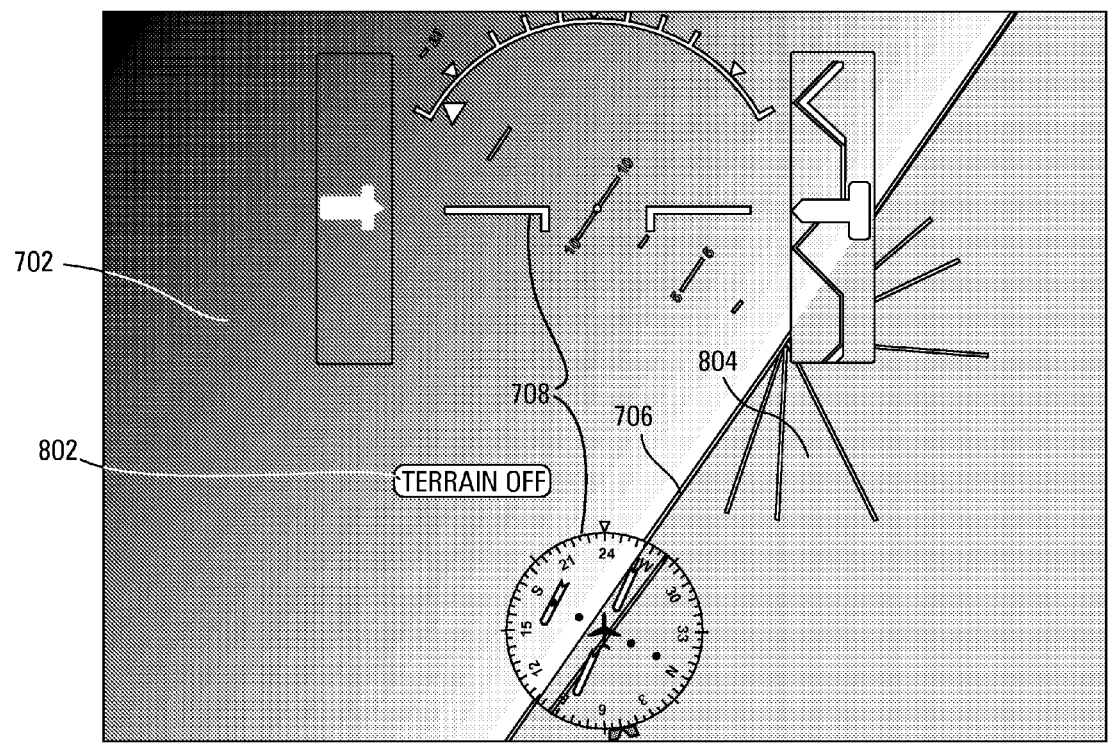
FIG. 8 is an image of a graphical display with a distinct display format for unusual attitude conditions according to one embodiment of the present invention.

In some embodiments, fading in a distinct display format also includes gradually changing the size of flight symbology relevant to attitude correction. For example, in some embodiments, pitch chevrons will gradually grow and decrease in size as the pitch angle increases and decreases, respectively. Also, in some embodiments, the zero-pitch line gradually increases in size. In other embodiments, other flight symbology relevant to attitude correction gradually changes size. Further, in some embodiments, fading in a distinct display format includes gradually changing the color of flight symbology to aid flight crews during unusual attitude conditions. In some embodiments, during the fading process, a distinct display format and a normal attitude display format are displayed substantially simultaneously with varied degrees of prominence based on the craft attitude angle. In other embodiments, during the fading process, a distinct display format and a normal attitude display format are displayed substantially independently from one another. That is, display of one format does not occur until the other has substantially faded from the display. FIGS. 2 and 3 describe exemplary embodiments of methods showing when to start fading and how to fade in a distinct display format. FIGS. 6 and 8 are images of exemplary embodiments showing distinct display formats as described above with respect to FIG. 1.

FIG. 2 is a flow chart showing another method of dynamically transitioning into a distinct display format according to one embodiment of the present invention. At 202, attitude data is collected from sensors, such as inertial gyroscopes, which measure attitude angles. At 204, the current aircraft attitude obtained from the attitude data is compared to a set attitude angle for each attitude angle measured (i.e. pitch angle, yaw angle, and bank angle). If current aircraft attitude is less than a set attitude angle corresponding to the attitude angle being measured, the process returns to 202 and updated current attitude data is collected. If a current aircraft attitude angle is greater than the corresponding set attitude angle, it is determined that the aircraft is entering unusual attitude conditions and the process continues at 206. The set angle varies depending on the type of craft, flight conditions, and attitude angle being analyzed. For example, in some embodiments, a set attitude angle for an aircraft is not the same as a set attitude angle for a helicopter. Additionally, in some embodiments, a set attitude angle for analyzing a bank angle is different than a set attitude angle for measuring pitch angle. Further, in some embodiments, a set attitude angle for measuring a positive pitch angle is not the same as a set attitude angle for measuring a negative pitch angle, where positive and negative is determined in relation to a zero-pitch reference line.

At 206, a distinct display format transitions into the display by gradually fading in as discussed above with regards to FIG. 1. This includes fading out perspective view graphics such as 3-dimensional terrain, aligning the horizon line on the display with the zero-pitch reference line, and changing the size of flight symbology relevant to attitude correction. These transitions do not occur abruptly, but rather they occur gradually as the display is faded in. In some embodiments, the transition occurs at a substantially uniform rate over a set period of time. In some embodiments, the set period of time is 3 seconds. In other embodiments, the transition or fade rate is a rate based on the rate at which the craft attitude angle deviates from the set attitude angle. As discussed above, this gradual transition aids flight crews by alerting them to unusual attitude conditions and displaying information used in attitude correction without distracting or startling the flight crew. At 208, attitude data is again collected. At 210, the attitude data is analyzed to determine if the attitude has returned to normal. If the attitude continues to be unusual, the process returns to 208 to collect updated attitude condition data. This process continues until the data indicates, at 210, that attitude conditions have been returned to normal. Once attitude conditions have returned to normal, the distinct display format is faded out and the display returns to the normal attitude display format for normal flight conditions at 212. In some embodiments, fading out the distinct display format includes fading in perspective view graphics, such as 3-dimensional terrain, and other flight symbols that were faded out at 206. In some embodiments, fading out the distinct display format includes fixing a zero-pitch reference line at a selected position during the process of fading the distinct display format out of the display. The process ends at 214.

FIG. 3 is a flow chart showing another method of dynamically transitioning into a distinct display format according to one embodiment of the present invention. At 302, attitude data is collected from sensors, such as inertial gyroscopes, which measure attitude angles. At 304, the data is analyzed to determine if an aircraft attitude angle has reached a first set angle corresponding to the aircraft attitude angle being measured. In other words, at least one of the attitude angles is compared to a corresponding first set angle. The first set angle varies depending on the type of craft, flight conditions, and attitude angle being analyzed. If the result of the analysis at 304 is that an aircraft attitude angle has not reached a first set angle, the process returns to 302 and updated current attitude data is collected. If the result of the analysis at 304 is that an aircraft attitude angle has reached a first set angle, the process continues at 306.

At 306, a transition begins gradually fading in a distinct display format as described above with regards to FIG. 1. This includes fading out perspective view graphics such as 3-dimensional terrain, aligning the horizon line on the display with the zero-pitch reference line, and changing the size of flight symbology relevant to attitude correction. These transitions do not occur abruptly, but rather they occur gradually as the display is faded in. In some embodiments, the rate of transition or fading is based on a continuous function of the rate of attitude change between the first set attitude angle and a second set attitude angle. In such embodiments, the percentage of fading depends on the attitude angle of the craft between the first and second set attitude angles such that the first set attitude angle corresponds substantially to 100 percent display of a normal attitude display format and the second set attitude angle corresponds substantially to 100 percent display of a distinct display format.

Figure 3B:
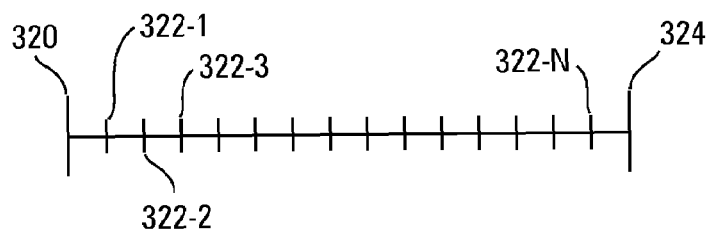
FIG. 3B is a diagram representing a range of degree increments over which a distinct display format is faded in and out according to one embodiment of the present invention.

In other embodiments, the rate of transition or fade is based on an incremental change between the first set angle and a second set angle corresponding to the aircraft attitude angle being measured, as shown in FIG. 3B. In FIG. 3B the number of degrees between first set angle 320 and second set angle 324 are divided into N increments 322-1 ... 322-N. In some embodiments, the N increments are substantially equally spaced. In other embodiments, the N increments are spaced at varying sizes. Each of increments 322-1 ... 322-N is assigned a percentage of fading the distinct display format. The percentage of fading is correlated to a percentage of transparency/opacity. For example, in one embodiment, 322-1 is assigned 2% fading, 322-2 is assigned 4% fading, 322-3 is assigned 6% fading and so on to 322-N which is assigned 100% fading. For graphics being faded out, such as 3-dimensional terrain, 322-1 corresponds to 2% transparency of such graphics, 322-2 corresponds to 4% transparency, and so on. For graphics being faded in, 322-1 corresponds to 2% opacity, 322-2 corresponds to 4% opacity, and so on. Hence, when the attitude angle reaches second set angle 324, a distinct display format is 100% faded in. Likewise, when the attitude angle returns to first set angle 320, a distinct display format is 100% faded out. In these embodiments, the set angles and respective ranges vary with aircraft type, flying conditions, and angle being measured. For example, in one embodiment, first set angle 320 is 52° and second set angle 324 is 55° when measuring bank; whereas, first set angle 320 is 29° and second set angle 324 is 32° when measuring positive pitch angle. Additionally, in some embodiments, set pitch angles are different when measuring negative pitch angles than when measuring positive pitch angles.

In some embodiments, for symbology which changes size, each of increments 322-1 ... 322-N correspond to a percentage change in size. However, the percentage change in size is not necessarily the same as the percentage of fading. For example, in one embodiment, 322-1 corresponds to 2% fading but, it corresponds to 10% increase in normal size. Additionally, size change is not limited to 100% increase in size. Therefore, in some embodiments, size can continue to change beyond reaching second set angle 324 based on similarly spaced continuing increments beyond second set angle 324. Hence, the change in size is based on attitude measurements taken during unusual attitude conditions. Similarly, in some embodiments, for symbology which changes color, each of increments 322-1 ... 322-N correspond to a percentage change in color. However, the percentage change in color is not necessarily the same as the percentage of fading. For example, in one embodiment, 322-1 corresponds to 2% fading but, it corresponds to 10% color change. Additionally, color change is not limited to 100%. Therefore, in some embodiments, color can continue to change beyond reaching second set angle 324 based on continuing increments beyond second set angle 324.

In other embodiments, the rate of fading in a distinct display format is based on a continuous function of a rate of attitude change between a first set attitude angle and a second set attitude angle while the rate of fading out a distinct display format is based on a continuous function of a rate of attitude change between a third set attitude angle and a fourth set attitude angle. In such embodiments, the percentage of fading in the distinct display format depends on the attitude angle of the craft between the first and second set attitude angles such that the second set attitude angle corresponds substantially to 100 percent display of the distinct display format. Additionally, in such embodiments, the percentage of fading out the distinct display format depends on the attitude angle of the craft between the third and fourth set attitude angles such that the fourth set attitude angle corresponds substantially to 100 percent display of the normal attitude display format.

Figure 3C:
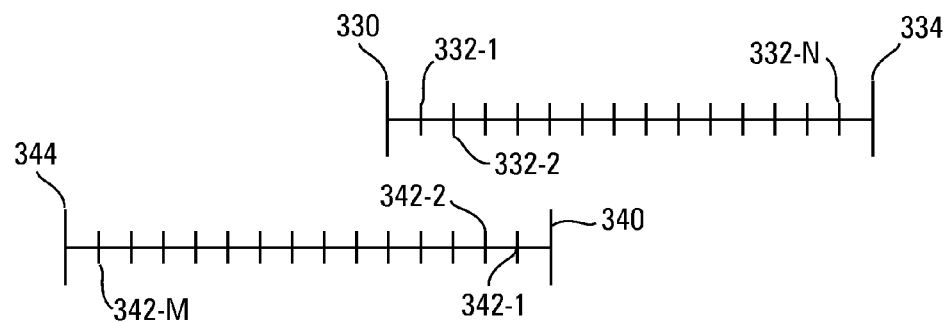
FIG. 3C is a diagram representing ranges of degree increments over which a distinct display format is faded in and out according to one embodiment of the present invention.

In other embodiments, the rate of fading in a distinct display format is based on an incremental change between a first set attitude angle and a second set attitude angle while the rate of fading out a distinct display format is based on an incremental change between a third set attitude angle and a fourth set attitude angle as shown in FIG. 3C. In FIG. 3C the number of degrees between first set angle 330 and second set angle 334 are divided into N substantially equally spaced increments 332-1 . . . 332-N. Each of increments 332-1 . . . 332-N is assigned a percentage of fading in the distinct display format. The percentage of fading in is correlated to a percentage of transparency/opacity as described above with regards to FIG. 3B. The number of degrees between third set angle 340 and fourth set angle 344 are divided into M substantially equally spaced increments 342-1 . . . 342-M. Each of increments 342-1 . . . 342-M is assigned a percentage of fading out the distinct display format. The percentage of fading out is correlated to a percentage of transparency/opacity as described in relation to FIG. 3B.

As shown in FIG. 3C, the range of degrees from third set angle 340 to fourth set angle 344 overlaps the range from first set angle 330 to second set angle 334. In other embodiments, the ranges do not overlap. Hence, fading in a distinct display format is triggered when attitude of the aircraft reaches first set angle 330 and finishes fading in when attitude reaches second set angle 334; whereas, fading out a distinct display format is triggered when attitude reaches third set angle 340 and finishes fading out when attitude reaches fourth set angle 344. Overlapping the ranges avoids causing a distinct display to flash which occurs when starting both fading in and out at the same set angle. In these embodiments, the set angles and respective ranges vary with aircraft type, flying conditions, and angle being measured. For example, in one embodiment, first set angle 330 is 52°, second set angle 334 is 55°, third set angle 340 is 53°, and fourth set angle 344 is 50° when measuring bank; whereas, first set angle 330 is 29°, second set angle 334 is 32°, third set angle 340 is 30°, and fourth set angle 344 is 27° when measuring positive pitch angle. In some embodiments, set pitch angles are different when measuring negative pitch angles than when measuring positive pitch angles.

After transition (i.e. fading) of a distinct display format begins at 306, current attitude data is obtained at 308. At 310, a check is performed to determine if attitude has changed since the previous measurement of attitude. If attitude has not changed, the process returns to 308 where current updated attitude data is obtained. If attitude has changed, the amount of fading in/out a distinct display format changes accordingly as described above with respect to FIGS. 3B and 3C. At 314, it is determined if attitude angles have returned to normal attitude angles. If they have not, the process returns to 308. If attitude angles have returned to normal attitude angles, the process ends at 316. In some embodiments, fading out a distinct display format is delayed a set period of time after returning to normal attitude angles. In one such embodiment, fading out a distinct display format is delayed when an aircraft has been in a roll with angles over 65°. In some embodiments, the delay is set at 6 seconds. The delay prevents confusion which might result from repeated fading in/out of a distinct display format if the aircraft alternates between unusual and normal attitude conditions in quick succession.

Figure 4:
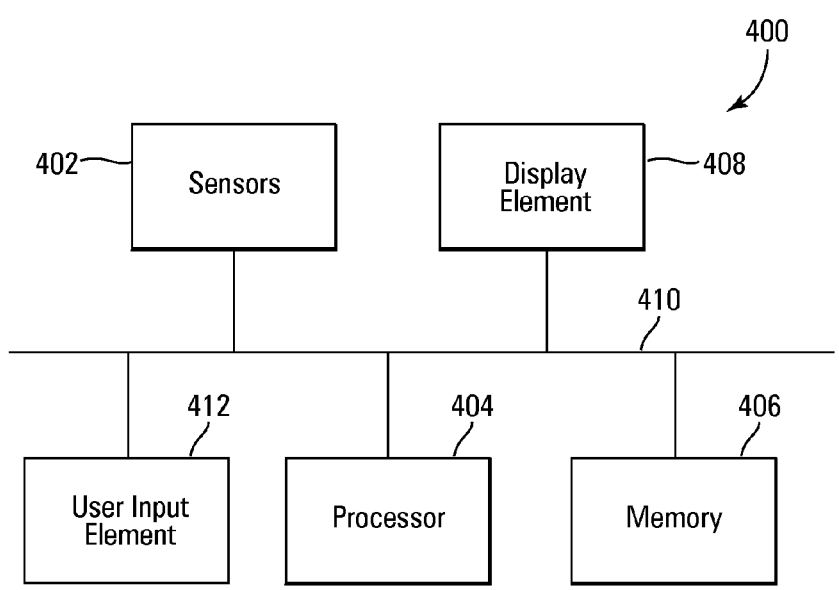
FIG. 4 is a block diagram of a graphical display system which dynamically transitions into a distinct display format during unusual attitude conditions according to one embodiment of the present invention.

FIG. 4 is a block diagram of a graphical display system which dynamically transitions into a distinct display format during unusual attitude conditions according to one embodiment of the present invention. In FIG. 4, an exemplary graphical display system 400 includes processor 404 configured to provide data to display element 408 for display. One or more data sources are coupled to processor 404 via bus 410. These data sources include, but are not limited to, sensors 402, user input element 412 and memory 406. In some embodiments, one or more of these data sources are omitted. In some embodiments, sensors 402 are used to provide attitude data to processor 404 for use by processor 404 in determining when to fade out perspective view graphics and fade in a distinct unusual attitude display. Sensors 402 include, but are not limited to, gyroscopes, accelerometers, magnetometers, global positioning system (GPS) receivers, etc.

User input element 412 includes, but is not limited to, keyboards, touch screens, microphones, etc. In some embodiments, user input element 412 comprises more than one type of input element. In other embodiments, display system 400 does not include user input element 412. User input element 412 is used to provide user feedback to display system 400. Such feedback includes, but is not limited to, a pilot override preventing the fading in of a distinct display format.

Memory 406 includes any type of suitable medium such as floppy disks, conventional hard disks, CD-ROM, flash memory ROM, nonvolatile ROM, RAM, or other suitable medium. Processor 404 and memory 406 are coupled together allowing processor 404 to write to and store data in memory 406 as well as retrieve stored data from memory 406. In one embodiment, memory 406 stores data received by processor 404 from sensors 402. In other embodiments, memory 406 temporarily stores data to be transmitted from processor 404 to display element 408. In other embodiments, memory 406 is used to store a database of graphics for retrieval by processor 404 and display on display element 408. In yet other embodiments, memory 406 is used to store analysis result data calculated by processor 404, such as a rate of attitude transition.

Processor 404 includes or interfaces with hardware components that support the graphics display system. By way of example and not by way of limitation, these hardware components include one or more microprocessors, graphics processors, memories, storage devices, interface cards, and other standard components known in the art. Additionally, processor 404 includes or functions with software programs, firmware or computer readable instructions for carrying out various methods, process tasks, calculations, control functions, and the generation of display signals and other data used in the operation of the display system. These instructions are typically stored on any appropriate medium used for storage of computer readable instructions such as floppy disks, conventional hard disks, CD-ROM, flash ROM, nonvolatile ROM, RAM, and other like medium. In some embodiments, these instructions are stored on memory 406.

Display element 408 includes any display element suitable for displaying the various symbols and information for the operation of embodiments of the present invention. There are many known display elements that are suitable for this task, such as various CRT, active matrix LCD and passive matrix LCD display systems. Processor 404 sends appropriate signals and data to display element 408. These signals and data instruct display element 408 which graphics to display and include instructions for fading out perspective view graphics and fading in a distinct unusual attitude display necessary for the operation of embodiments of the present invention.

Figure 5:
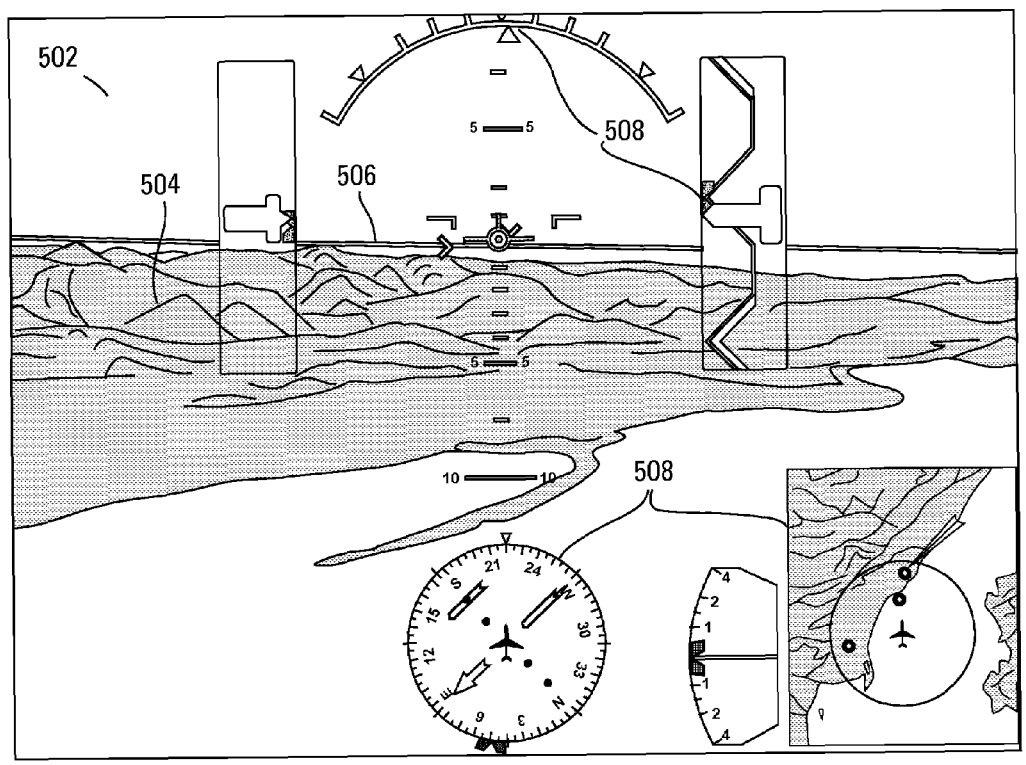
FIG. 5 is an image of a graphical display during flight according to one embodiment of the present invention.

FIG. 5 is an image of a graphical display during flight according to one embodiment of the present invention. As shown, FIG. 5 includes sky 502, terrain 504, zero-pitch reference line 506, and flight symbology 508. FIG. 6 is an image of a graphical display with a distinct display format for unusual attitude conditions according to one embodiment of the present invention. As shown, the embodiment in FIG. 6 includes sky 502 and terrain 504. In other embodiments, terrain 504 is faded out. In FIG. 6, the portion of sky 502 below zero-pitch reference line 506 has faded in or darkened gradually which aids the flight crew in locating and distinguishing zero-pitch reference line 506. Additionally, in FIG. 6 zero-pitch reference line 506 has changed appearance to indicate unusual attitude conditions. As shown in FIG. 6, zero-pitch reference line 506 has changed from a solid white line in FIG. 5 to a dotted white line in FIG. 6. Additionally, pitch chevron 610 has faded into the display in FIG. 5. The changes do not occur abruptly but gradually, as described in relation to FIGS. 1-3C, so as not to distract or startle a flight crew.

Figure 7:
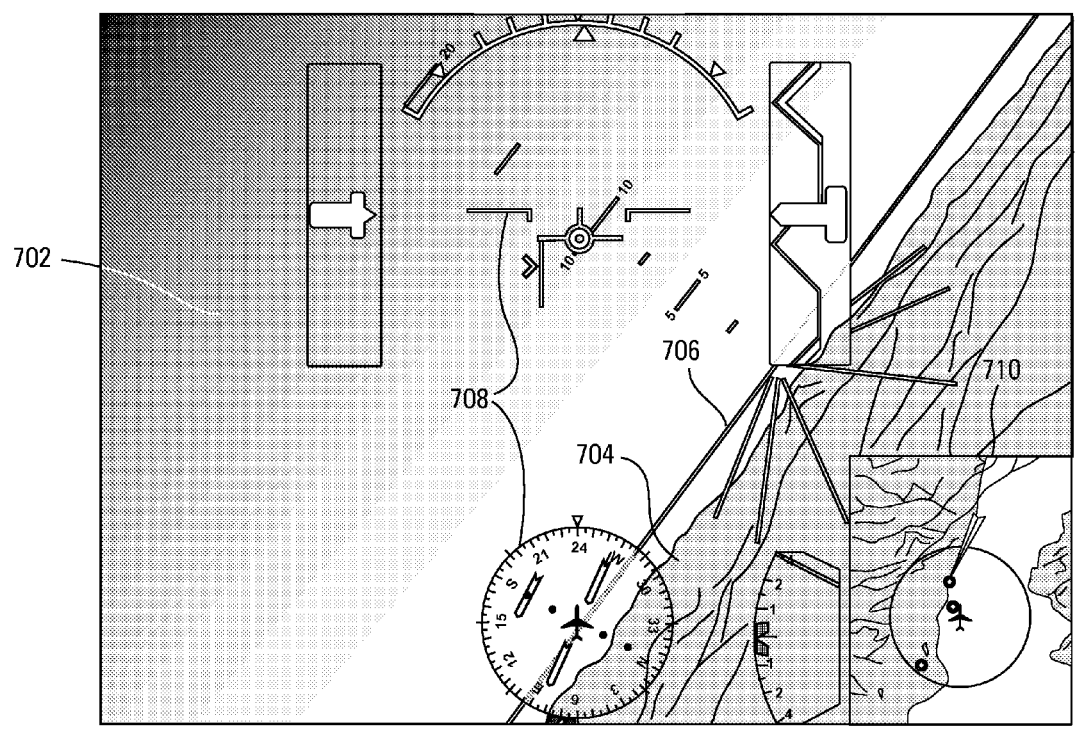
FIG. 7 is an image of a graphical display during flight according to one embodiment of the present invention.

FIG. 7 is an image of a graphical display during flight according to one embodiment of the present invention. As shown, FIG. 7 includes sky 702, terrain 704, zero-pitch reference line 706, and flight symbology 708 and 710. FIG. 8 is an image of a graphical display with a distinct display format for unusual attitude conditions according to one embodiment of the present invention. As shown, the embodiment in FIG. 8 includes sky 702. However, sky 702 has changed to a darker, more intense color as shown. Terrain 704 has faded out and been replaced by flat background 804. In some embodiments, flat background is brown. In other embodiments, other colors are used. Additionally, flight symbology 710 has faded out. Flight symbology 708 remains and warning 802 has faded in. Warning 802 serves as an additional indicator to flight crews of unusual attitude conditions. The changes from FIG. 7 to FIG. 8 occur gradually as described above with regards to FIGS. 1-3C.

Although specific embodiments have been illustrated and described herein, it will be appreciated by those of ordinary skill in the art that any arrangement, which is calculated to achieve the same purpose, may be substituted for the specific embodiment shown. For example, although the specific embodiments illustrated are directed at aircraft, the method and apparatus may be used in various embodiments employing various types of crafts, such as space craft, helicopters, and unmanned air vehicles (UAV). This application is intended to cover any adaptations or variations of the present invention. Therefore, it is manifestly intended that this invention be limited only by the claims and the equivalents thereof.

What is claimed is:

1. A method of dynamically transitioning into a distinct display format during unusual attitude conditions, the method comprising:
   collecting attitude data;
   comparing current attitude to a first set attitude angle; and
   fading a distinct display format into a display for unusual attitude conditions when current attitude is at least equal to the first set attitude angle, wherein fading the distinct display format into the display includes fading out perspective view graphics.

2. The method of claim 1, wherein fading a distinct display format onto a display includes one of:
   displaying substantially simultaneously the distinct display format and a normal attitude display format with varied degrees of prominence on the display based on the craft attitude angle; and
   displaying the distinct display format substantially independently of the display of the normal attitude display format.

3. The method of claim 1, wherein fading a distinct display format onto a display includes one of:
   fading a distinct display format onto a display at a substantially uniform rate over a set period of time; and
   fading a distinct display format onto a display at a rate based on the rate at which the craft attitude angle deviates from the first set attitude angle.

4. The method of claim 1, wherein fading a distinct display format into a display further includes one or more of:
   aligning gradually a zero-pitch reference line with a display horizon line and maintaining the zero-pitch reference line aligned with the display horizon during unusual attitude conditions;
   changing gradually the size of flight symbology relevant to attitude correction;
   changing the appearance of a zero-pitch reference line; and
   fading in a two color overlay wherein the color above a zero-pitch reference line is different from the color below zero-pitch reference line.

5. The method of claim 1, wherein fading a distinct display format onto a display comprises:
   dividing the number of degrees between the first set attitude angle and a second set attitude angle into N increments;
   assigning each of N increments to a percentage of fading; and
   fading in the distinct display format the assigned percentage of fading as current attitude reaches each of N increments, such that when current attitude reaches the second set attitude the distinct display format is substantially finished fading into the display and when current attitude returns to the first set attitude the distinct display format is substantially finished fading out of the display.

6. The method of claim 1, wherein fading a distinct display format onto a display comprises:
   dividing the number of degrees between the first set attitude angle and a second set attitude angle into N increments;
   dividing the number of degrees between a third set attitude angle and a fourth set attitude angle into M increments;
   assigning each of N increments to a percentage of fading the distinct display format into the display;
   assigning each of M increments to a percentage of fading the distinct display format out of the display;
   fading in the distinct display format the assigned percentage of fading as current attitude reaches each of N increments; and
   fading out the distinct display format the assigned percentage of fading as current attitude returns to each of M increments.

7. The method of claim 1, wherein fading a distinct display format onto a display comprises one of:
   fading in the distinct display format as a continuous function of the craft attitude angle between a first set attitude angle and a second set attitude angle such that the first attitude angle corresponds substantially to 100 percent display of a normal attitude display format and the second set attitude angle corresponds substantially to 100 percent display of the distinct display format; and fading in the distinct display format as a continuous function of the craft attitude angle between a first set attitude angle and a second set attitude angle and fading out the distinct display format as a continuous function of the craft attitude angle between a third set attitude angle and a fourth set attitude angle such that the second set attitude angle corresponds substantially to 100 percent display of the distinct display format and the fourth set attitude angle corresponds substantially to 100 percent display of a normal attitude display format.

8. The method of claim 7, wherein fading out the distinct display format as a continuous function of the craft attitude angle between a third set attitude angle and a fourth set attitude angle includes:

setting the third attitude angle such that perspective view terrain features are substantially faded out of the display at the third attitude angle; and setting the fourth attitude angle such that perspective view terrain features substantially cover the entire display at the fourth attitude angle.

9. The method of claim 1, further comprising: fading a distinct display format out of the display once attitude returns to normal.

10. The method of claim 9, wherein fading a distinct display format out of the display includes one of:

delaying for a period of time after attitude is no longer in unusual attitude conditions before fading a distinct display format out of the display; and fixing a zero-pitch reference line at a selected position during the process of fading a distinct display format out of the display.

11. A graphical display system comprising:

one or more sensors for collecting attitude data;

a display element for displaying flight data; and at least one processor coupled to the one or more sensors and the display element for processing data collected by the one or more sensors, wherein the at least one processor sends signals to the display element instructing the display element to fade in a distinct display format when a current attitude angle reaches a first set attitude angle, wherein the signals instruct the display element to fade out perspective view graphics.

12. The graphical display system of claim 11, wherein the at least one processor:

divides the number of degrees between the first set attitude angle and a second set attitude angle into N equally spaced increments;

assigns each of the N increments to a percentage of fading; and sends a signal to the display element to fade in the distinct display format the assigned percentage of fading when a current attitude angle reaches each of the N increments.

13. The graphical display system of claim 11, wherein the at least one processor:

divides the number of degrees between the first set attitude angle and a second set attitude angle into N equally spaced increments;

divides the number of degrees between a third set attitude angle and a fourth set attitude angle into M equally spaced increments;

assigns each of N increments to a percentage of fading the distinct display format into the display; assigns each of M increments to a percentage of fading the distinct display format out of the display;

sends a signal to the display element to fade in the distinct display format the assigned percentage of fading when a current attitude angle reaches each of the N increments; and sends a signal to the display element to fade out the distinct display format the assigned percentage of fading when a current attitude angle returns to each of the M increments.

14. The graphical display system of claim 11, wherein the signals to the display element instructing the display element to fade in a distinct display format include one of:

signals instructing the display element to fade out perspective view graphics; and signals instructing the display element to fade a distinct display format onto a display at a substantially uniform rate over a set period of time when a current attitude angle reaches the first set attitude angle.

15. The graphical display system of claim 11, wherein:

the at least one processor sends signals to a display element instructing the display element to fade a distinct display format out of the display when attitude conditions are no longer unusual.

16. The graphical display system of claim 11, further comprising:

a user input element for receiving a user input which suspends performance of the instructions for fading a distinct display format into a display.

17. A computer readable medium having computer-executable instructions for performing a method of dynamically transitioning into a distinct display format during unusual attitude conditions, the method comprising:

measuring at least one of a plurality of attitude angles, wherein the plurality of attitude angles define a craft's attitude;

comparing the at least one of a plurality of attitude angles to a corresponding first set attitude angle; and sending a signal to a display element instructing the display element to gradually fade in a distinct display format once at least one of the plurality of attitude angles equals the corresponding first set attitude angle, wherein the signal comprises instructions to gradually fade out perspective view graphics.

18. The computer readable medium of claim 17, wherein sending a signal to gradually fade in a distinct display format further includes:

sending a signal to gradually align a zero-pitch reference line with a display horizon line and maintain the zero-pitch reference line aligned with the display horizon during unusual attitude conditions; and sending a signal to fade in a distinct display format onto a display at a substantially uniform rate over a set period of time.

19. The computer readable medium of claim 18, further comprising: determining a rate at which to fade in a distinct display format.

20. The computer readable medium of claim 19, wherein determining a rate at which to fade in a distinct display format includes:

dividing the number of degrees between the first set attitude angle and a corresponding second set attitude angle into N equally spaced increments;

assigning each of N increments to a percentage of fading; and fading the distinct display format the assigned percentage of fading as a measured attitude angle of the plurality of attitude angles reaches each of the N increments.

21. The computer readable medium of claim 19, wherein determining a rate at which to fade in a distinct display format includes:
dividing the number of degrees between the first set attitude angle and a second set attitude angle into N equally spaced increments;
dividing the number of degrees between a third set attitude angle and a fourth set attitude angle into M equally spaced increments;
assigning each of N increments to a percentage of fading the distinct display format into the display; assigning each of M increments to a percentage of fading the distinct display format out of the display;
fading in the distinct display format the assigned percentage of fading as a measured attitude angle of the plurality of attitude angles reaches each of the N increments; and
fading out the distinct display format the assigned percentage of fading as a measured attitude angle of the plurality of attitude angles returns to each of the M increments.

22. The computer readable medium of claim 18, further comprising:
sending a signal to a display element to fade a distinct display format out of the display once attitude is no longer in unusual attitude conditions.

23. The computer readable medium of claim 18, wherein sending a signal to a display element to fade a distinct display format out of the display includes: delaying for a period of time after attitude is no longer in unusual attitude conditions before sending a signal to fade a distinct display format out of the display.

24. A graphical display system, comprising:
means for collecting attitude data;
means for executing instructions for fading in a distinct display format when a current attitude angle reaches a first set attitude angle, wherein the executing means comprises executing means for fading out perspective view graphics; and
means for displaying the distinct display format.

\* \* \* \* \*